United States Patent [19]

Guilino

[11] Patent Number: 4,784,482
[45] Date of Patent: Nov. 15, 1988

[54] MULTIFOCAL SPECTACLE LENS WITH HIGH POSITIVE FOCAL POWER

[75] Inventor: Günther Guilino, Munich, Fed. Rep. of Germany

[73] Assignee: Optische Werke G. Rodenstock, Munich, Fed. Rep. of Germany

[21] Appl. No.: 946,605

[22] Filed: Dec. 29, 1986

Related U.S. Application Data

[63] Continuation of Ser. No. 763,838, filed as PCT DE84/00263, May 12, 1984, published as WO85/02689, Jun. 20, 1985, abandoned.

[30] Foreign Application Priority Data

May 12, 1983 [DE] Fed. Rep. of Germany ....... 3343891

[51] Int. Cl.$^4$ ............................................. G02C 7/06
[52] U.S. Cl. .................... 351/169; 351/167
[58] Field of Search ......................... 351/167, 168–172

[56] References Cited

U.S. PATENT DOCUMENTS

| | | | |
|---|---|---|---|
| 2,410,145 | 10/1946 | Bardwell | 351/168 |
| 2,518,099 | 8/1950 | Tillyer | 351/168 X |
| 3,169,247 | 2/1965 | Davis et al. | 351/167 |
| 4,073,578 | 2/1978 | Welsh | 351/167 |
| 4,181,409 | 1/1980 | Whitney et al. | 351/167 |
| 4,185,897 | 1/1980 | Frieder | 351/167 |
| 4,504,128 | 3/1985 | Guilino et al. | 351/167 |

FOREIGN PATENT DOCUMENTS

3225270 2/1983 Fed. Rep. of Germany .

OTHER PUBLICATIONS

Koetting, R. A; "Progressive Addition Spectacles over Contact Lenses in Aphakia"; *Am. Jour. of Optometry and Archives;* vol. 46, No. 6; Jun. 1969; pp. 470–475.

*Primary Examiner*—John K. Corbin
*Assistant Examiner*—Scott J. Sugarman
*Attorney, Agent, or Firm*—Kalish & Gilster

[57] ABSTRACT

A multifocal spectacle lens is described with a high positive focal power, with a convex front surface which comprises an aspheric focal portion with an additional near segment, a transition zone surrounding the focal portion and a rim zone, and with an inside surface which forms an afocal margin together with the rim zone. The multifocal spectacle lens according to this invention is characterized by the fact that the near segment has an aspheric design and is separated from the focal section above it by a dividing line which has an approximately straight course. The main meridian of the near segment carries over into the main meridian of the focal section above it continuously and practically without any jump. In an advantageous further design of the spectacle lens according to this invention, an aspheric intermediate portion is provided between the near segment and the distance portion being separated from the distance portion by a dividing line with an approximately straight course and whose vertical main meridian also carries over into the main meridian of the distance portion continuously and practically without any jump.

12 Claims, 1 Drawing Sheet

MULTIFOCAL SPECTACLE LENS WITH HIGH POSITIVE FOCAL POWER

CROSS REFERENCE TO RELATED APPLICATIONS

This is a continuation of application Ser. No. 763,838, filed as PCT DE84/00263 on May 12, 1984, published as WO85/02689 on Jun. 20, 1985, now abandoned.

BACKGROUND OF THE INVENTION

The present invention relates to a multifocal spectacle lens with a high positive focal power such as is needed by people with very poor sight, for example by people who have undergone cataract surgery.

FIELD OF THE INVENTION

A known spectacle lens has a sperical near segment in the form of a spherical button "affixed" to the aspherical focal section which serves as the distance portion.

As spectacle lenses with a high positive focal power are normally manufactured in a casting process from a plastic material, the known spectacle lens with an "affixed" near segment is simple to manufacture; a spherically shaped recess for the near segment is simply worked into the mould for the single vision lens. The affixed near segment has, however, the disadvantage of an unattractive appearance and, in addition, it can only be manufactured with relatively small dimensions so that near vision is limited. Furthermore, the known spherical near segments have only poor image reproduction qualities, particularly with the required high focal powers.

SUMMARY OF THE INVENTION

The object of this invention is to further develop a spectacle lens with a high positive focal power in such a way that the spectacle lens will remain simple in manufacture while offering a large near segment with good optical properties.

According to this invention, the fact that the near segment is also aspheric permits a satisfactory correction in the near segment too. In addition, the near segment completely takes up the whole of the focal section below a certain line. In conjunction with the good correction of the near segment, which is only possible due to the aspheric design, this makes possible uninterrupted vision in the near vision area. The continuous transition of the main meridian of the near segment into the main meridian of the focal section above the segment, which occurs with practically no jump, improves the cosmetic appearance of the multifocal spectacle lens according to this invention.

According to a further aspect of the invention, an aspheric intermediate portion is provided between the near segment and the distance portion, whereby the intermediate portion is separated from the distance portion above it in the same way as from the near segment, namely by a dividing line with an approximately horizontal course and whereby the main meridian of said intermediate portion goes into the main meridian of the distance portion in a continuous transition and with practically no jump. In practice this means that both the transition from the near segment to the intermediate portion above it and from the intermediate portion to the distance portion takes place with practically no jump in a certain area around the main meridian.

Furthermore, the aspheric design of the intermediate portion permits uninterrupted vision in the large intermediate portion which extends up to the rim sections of the focal area.

Thanks to the practically jump-free connection of the main meridians of the individual sections at the transition points according to an aspect of the invention, the cosmetic effect of the multifocal spectacle lens according to this invention is further improved.

Acording to a further inventive aspect, the dividing lines between the individual sections are tilted to correspond to the course of the main beam through the dividing line and the optical ocular point of rotation. In this way, the irritating effect of the dividing lines is limited in practice to an infinitesimally small area.

Advantageous dimensions are set forth for the distance portion and the intermediate portion. In this way, the dimensions of the individual sections are determined based on the usual diameter of the focal section of about 40 mm for spectacle lenses of the invention.

The design of a spectacle lens according to this invention demands a dividing line, i.e. a jump, between the distance portion and the near segment or between the distance portion and the intermediate portion and between the intermediate portion and the near segment. This jump which occurs in the focal section can also continue in the transition zone and in the margin.

However, it is particularly advantageous if the jump in the margin disappears as a result of a corresponding design improvement of the transition zone. In this way, the glazing of a spectacle lens according to this invention into a spectacle frame is made much easier. Furthermore, such a design of the transition zone in conjunction with the disappearing dividing line in the area of the main meridian also contributes to the improved cosmetic effect.

A general equation for the course of the transition zones is given, whereby these transition zones connect to the individual sections of the focal section and to rim and which go on to form the margin which, in turn, forms an afocal margin of constant thickness together with the inside surface.

The multifocal spectacle lens according to this invention can be constructed with good results in such a way that for the distance portion, the near segment and, where required, the intermediate portion, segments can be taken from surfaces such as are given numerically in DE-OS No. 32 25 270 and whose vertex powers correspond more or less to the desired focal power of the individual sections.

However, if required, the intermediate portion can also advantageously be optimised for distances for which the respective portions are used.

Of course, any of the general formula, such as those which are described in DE-OS No. 29 41 733, U.S. Pat. Nos. 3,781,097 or 3,169,247, can be used as the basis for the calculation of the surface segments of the individual portions of the focal section. However, it is of particular advantage to use a surface segment from a rotationally symmetrical surface which corresponds to the general formula $$z = \frac{Ch^2}{1 + \sqrt{1 - (K + 1)C^2 h^2}} + \sum_{i=3}^{6} I_i h^i$$

and then to optimize the corresponding surface according to the optimizing rules given in DE-OS No. 32 25 270.

It is also possible to use a surface segment from a surface with a toric portion, i.e. from a non-rotationally symmetrical surface, to compensate for the oblique astigmatism which occurs when looking through the near segment and, where present, the intermediate portion.

BRIEF DESCRIPTION OF THE DRAWINGS

The present invention is described in detail below with reference to the drawing in which.

DESCRIPTION OF THE PREFERRED EMBODIMENT

Figure 1:
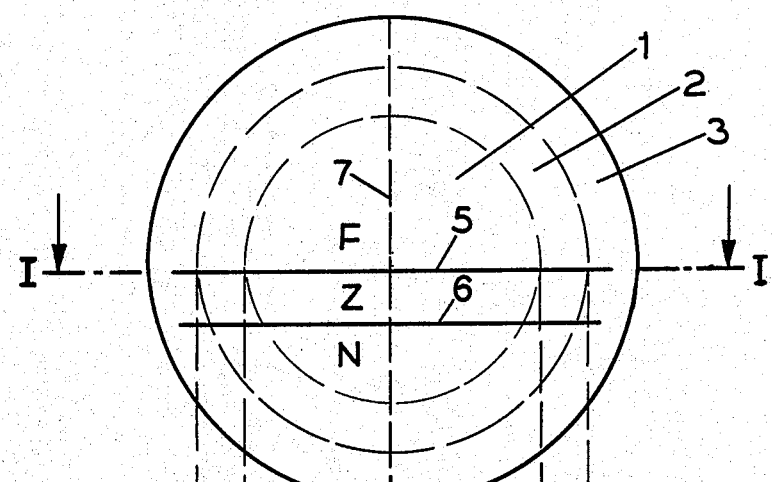
FIG. 1 is a top view of a spectacle lens according to the invention, and FIG. 2 a section through a spectacle lens according to the invention along the line I—I in FIG. 1.
Figure 2:
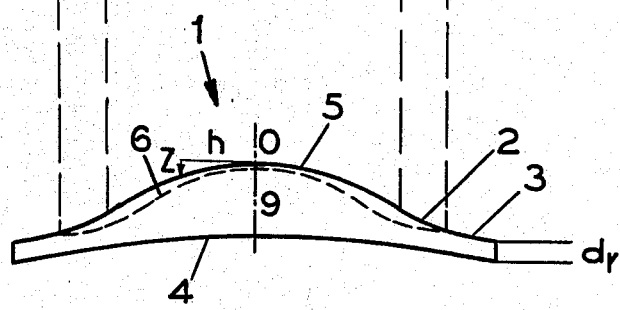

The spectacle lens according to the invention shown in FIGS. 1 and 2 possesses a focal section 1, a transition zone 2 which surrounds the focal section 1 like a ring, and a margin 3, connected to the transition zone 2, which forms an afocal margin of constant thickness with the inside surface 4.

The focal section 1 has a distance portion F, an intermediate portion Z and a near segment N. The individual sections are divided from one another by dividing lines or jumps 5 and 6 respectively which extend across the lens between opposite sides of the margin. The dividing lines 5 and 6 disappear mathematically exactly at the main, i.e. central, meridian 7 which goes over from one section to the section above or below it continuously and practically without any jump. In practice this means that the dividing lines or "jumps" between the individual sections are not noticeable in the area closely surrounding the main meridian.

The dimensions of the individual sections are determined based on the usual diameter of focal section 1 being about 40 mm. The optical center of the distance portion F is situated roughly 1 mm above the dividing line 5 to intermediate portion Z below. The height of intermediate portion Z is approximately 10 mm. The tangents in the direction of main meridian 7 at the transition points (crossing of the meridian by lines 5 and 6) include an angle of approximately 0.5°, being thus substantially jumpless. Intermediate portion Z is optimized for a distance of approximately 0.5 to 0.7 m and the near segment N is optimized for a distance of approximately 0.3 to 0.5 m.

In FIGS. 1 and 2 the main meridian 7 is vertical and the flat dividing lines 5 and 6 horizontal. Of course, the spectacle lens according to the invention can be tilted "nasally" in a known fashion. Also, the dividing lines can have such a course that they will run horizontally when the tilted spectacle lens is in the position of use.

The dividing lines 5 and 6 are tilted in accordance with the main beam through the separating line and with the ocular point of rotation.

For the individual sections, segments from rotationally symmetrical aspheric surfaces can be used. It is of special advantage if the general formula for the individual sections of the focal portion 1 is used as a basis for this is $$z = \frac{Ch^2}{1 + \sqrt{1 - (K+1)C^2h^2}} + \sum_{i=3}^{6} I_i h^i$$

where z=distance of a point on the focal section 1 from the vertex of 0 of the front surface 1 in the direction of the optical axis 9, and h=the distance of this point from the optical axis, and to optimise this according to the rules given in DE-OS No. 32 25 270. This German printed reference publication, which also contains numerical figure values for the individual coefficients, is expressly referred to with reference to all terms not individually explained here.

In this context, it is possible to use segments from the rotationally symmetrical surfaces given numerically in DE-OS No. 32 25 270 for the distance portion, the near segment and the intermediate portion, whereby the vertex power of these segments corresponds to the desired focal power for the distance portion, the near segment and the intermediate portion. Furthermore, it is also possible to optimise the intermediate portion and the near segment for those distances for which the respective portions are looked through with the optimizing rules given in DE-OS No. 32 25 270.

Of course, other known optimizing rules or general formula can also be used as a basis for the surface design.

In place of the segments discussed above out of rotationally symmetrical surfaces, non-rotationally symmetrical aspheric surface segments can also be used for the near segment and, if required, for the intermediate portion; that is, toric or atoric surfaces can be used, for example, whose toric portion is such that is compensates for the oblique astigmatism which occurs when the respective sections are looked through.

From FIG. 2 it can be seen that the transition zone in the area of the distance portion, the intermediate portion and the near segment is designed in such a way that the dividing lines 5 and 6 disappear in the margin 3 and that the rim zones 3 of all sections are uniform. The course of the transition zone can correspond to the general equation $$z_{N,F,Z} = \sum_{i=0}^{4} a_{i,N,F,Z} h^i \qquad \text{(Formula 2)}$$

where z=the distance of a point from the vertex of the front surface 1 in the direction of the optical axis 9, and h=the distance of this point from the optical axis.

The coefficients $a_{i,F,Z,N}$ are determined in such a way that the transition zone 2 is always next to the respective portion F, Z or N of the focal section 1 and to the margin 3 which forms an afocal margin of constant thickness with the inside surface 4 as regards functional value and first derivation.

I claim:

1. A multifocal spectacle lens with a high positive focal power, with a convex front surface, which comprises an aspheric focal section (1) with an additional near segment (N), a transition zone (2) surrounding the focal section and a rim zone (3), and including an inside surface which forms an afocal margin together with the rim zone, characterized by the near segment (N) being aspheric in form and separated from the focal section above it (F or Z) by a substantially horizontal dividing line (6) which has an approximately straight course, the lens having a main vertical meridian (7) passing through an optical axis (9) of the lens, the main meridian carrying over from the near segment into the focal section (1)

by transecting the horizontal dividing line, the dividing line disappearing mathematically at the main meridian, to provide thereby a transition along the main meridian between the near portion and the focal section, said transition being continuous to substantially avoid any jump in transition of vision along the meridian from the focal section to the near segment, or from the near segment to the focal section, along the main meridian.

2. A multifocal spectacle lens with a high positive focal power, with a convex front surface, which comprises an aspheric focal section (1) having a distance portion (F) with an additional near segment (N), a transition zone (2) surrounding the focal section and a rim zone (3), and including an inside surface which forms an afocal margin together with the rim zone, characterized by there being an aspheric intermediate portion (Z) situated between the near segment (N) and the distance portion (F), the intermediate portion being separated from the distance portion by a substantially horizontal dividing line (5) having an approximately straight course, the near segment (N) being aspheric in form and separated from the transition zone (Z) above it by a substantially horizontal dividing line (6) which has an approximately straight course, the lens having a main vertical meridian (7) passing through an optical axis (9) of the lens, the main meridian within the near segment (N) carrying over from the near segment into and across the intermediate portion into the distance portion transecting the horizontal dividing lines, the dividing lines disappearing mathematically at the main meridian, to provide thereby a transistion along the main meridian between the near portion and the intermediate portion and between the intermediate portion and the distance portion, said transitions being continuous to substantially avoid any jump, in transition of vision along the main meridian from one section to the next.

3. A spectacle lens according to claims 1 or 2, characterized by the fact that the tangents in the direction of the main meridian (7) at the transition points on the main meridian between the individual sections of the focal portion include an angle of approximately 0.5°.

4. A spectacle lens according to any one of claims 1 or 2, characterized by the fact that the optical center of the distance portion is situated roughly 1 mm above the dividing line to the portion below.

5. A spectacle lens according to claim 4, characterized by the fact that the height of the intermediate portion is approximately 10 mm.

6. A multifocal spectacle lens with a high positive focal power, with a convex front surface, which comprises an aspheric focal section (1) having a distance portion (F) with an additional near segment (N), a transition zone (2) surrounding the focal section and a rim zone (3), and including an inside surface which forms an afocal margin together with the rim zone, characterized by there being an aspheric intermediate portion (Z) situated between the near segment (N) and the distance portion (F), the intermediate portion being separated from the distance provided by a substantially horizontal dividing line (5) having an approximately straight course, the near segment (N) being aspheric in form and separated from the transition zone (Z) above it by a substantially horizontal dividing line (6) which has an approximately straight course, the lens having a main vertical meridian (7) passing through an optical axis (9) of the lens, the main meridian within the near segment (N) carrying over into the intermediate portion continuously and practically without any jump, and the main meridian within the intermediate portion carrying over into the distance portion continuously and practically without any jump, such that the lens is substantially jumpless along the main meridian from one section to the next, the optical center of the distance portion being situated roughly 1 mm above the dividing line to the portion below, the height of the intermediate portion being approximately 10 mm, the transition zone surrounding the focal portion being designed in such a way the dividing line between the individual sections of the focal portion disappear in the transition zone and the rim zones of all sections are uniform, and wherein the transition zone corresponds to the general equation $$z_{N,F,Z} = \sum_{i=0}^{4} a_{i,N,F,Z} h^i$$

where
z = the distance of a point from the vertex of the front surface in the direction of the optical axis, and
h = the distance of this point from the optical axis, and by the fact that the coefficients $a_{i,F,Z}$ or $_N$ are determined in such a way that with regard to the functional value and the first derivative the transition zone is always situated at the respective part (F,Z,N) of the focal portion (1) and the rim zone (3), which forms an afocal margin of constant thickness with the inside surface.

7. A spectacle lens according to claim 6, characterized by the fact that the intermediate portion is optimized for a distance of approximately 0.5 to 0.7 m and the near segment for a distance of approximately 0.3 to 0.5 m.

8. A spectacle lens according to claim 7, characterized by the fact that each of the sections of the focal portion is a surface segment from a rotationally symmetrical surface corresponding to the general formula $$z = \frac{Ch^2}{1 + \sqrt{1 - (K+1)C^2 h^2}} + \sum_{i=3}^{6} I_i h^i$$

where,
z = the distance (sagitta) of a point on the surface from the vertex of the surface,
h = the distance of this point from the optical axis, and C is determined by the desired focal power of each individual section of the focal portion,
and by the fact that the aspheric coefficients K, $I_3$, $I_4$, $I_5$ and $I_6$ are determined in such a way that the visual acuity in the whole area of the angle of view through the individual portion is maximal.

9. A spectacle lens according to claim 7, characterized by the fact that the near segment and, where present, the intermediate portion are designed torically or atorically in such a way that the oblique astigmatism is compensated for.

10. A multifocal spectacle lens with a high positive focal power, with a convex front surface, which comprises an aspheric focal section with an additional near segment, a transition zone surrounding the focal section and a rim zone, and including an inside surface which forms an afocal margin together with the rim zone, characterized by there being an aspheric intermediate portion situated between the near segment and the distance portion, the transition zone being separated from the distance portion by a substantially horizontal dividing line having an approximately straight course, the near segment being aspheric in form and separated from the intermediate portion above it by a substantially horizontal dividing line which has an approximately straight course, the lens having a main vertical meridian passing through an optical axis of the lens, the main meridian within the near segment carrying over into the intermediate portion continuously and practically without any jump, and the main meridian within the intermediate portion carrying over into the distance portion, continuously and practically without any jump, such that the lens is substantially jumpless along the main meridian from one section to the next, each of the sections of the focal portion being a surface segment from a rotationally symmetrical surface corresponding to the general formula $$z = \frac{Ch^2}{1 + \sqrt{1 - (K+1)C^2h^2}} + \sum_{i=3}^{6} I_i h^i$$

where $z=$ the distance (sagitta) of a point on the surface from the vertex of this surface, $h=$ the distance of this point from the optical axis, and C is determined by the desired focal power of each individual section of the focal portion, and by the fact that the aspheric coefficients K, $I_3$, $I_4$, $I_5$ and $I_6$ are determined in such a way that the visual acuity in the whole area of the angle of view through the individual portion is maximal, the transition zone (2) corresponding to the general equation $$z_{N,F,Z} = \sum_{i=0}^{4} a_{i,N,F,Z} h^i$$

where $z=$ the distance of a point from the vertex of the front surface in the direction of the optical axis, and $h=$ the distance of this point from the optical axis, and by the fact that the coefficients $a_{i,F,Z,N}$ are determined in such a way that with regard to the functional value and the first derivative the transition zone is always situated at the respective part (F,Z,N) of the focal portion and the rim zone which forms an afocal margin of constant thickness with the inside surface.

11. A spectacle lens according to claim 10 characterized by the fact that the tangents in the direction of the main meridian at the transition points on the main meridian between the individual sections of the focal portion include an angle of approximately 0.5°.

12. A multifocal spectacle lens with a high positive focal power, with a convex front surface, which comprises an aspheric focal section (1) having a distance portion (F) with an additional near segment (N), a transition zone (2) surrounding the focal section and a rim zone (3), and including an inside surface which forms an afocal margin together with the rim zone, characterized by there being an aspheric intermediate portion (Z) situated between the near segment (N) and the distance portion (F), the intermediate portion being separated from the distance portion by a substantially horizontal dividing line (5) having an approximately straight course, the near segment (N) being aspheric in form and separated from the transition zone (Z) above it by a substantially horizontal dividing line (6) which has an approximately straight course, the lens having a main vertical meridian (7) passing through an optical axis (9) of the lens, the main meridian within the near segment (N) carrying over into the intermediate portion continuously and practically without any jump, and the main meridian within the intermediate portion carrying over into the distance portion continuously and practically without any jump, such that the lens is substantially jumpless along the main meridian from one section to the next, the transition zone surrounding the focal portion being designed in such a way the dividing line between the individual sections of the focal portion disappears mathematically in the transition zone and the rim zones of all sections are uniform, and wherein the transition zone corresponds to the general equation $$z_{N,F,Z} = \sum_{i=0}^{4} a_{i,N,F,Z} h^i$$

where $z=$ the distance of a point from the vertex of the front surface in the direction of the optical axis, and $h=$ the distance of this point from the optical axis, and by the fact that the coefficients $a_{i,F,Z}$ or $_N$ are determined in such a way that with regard to the functional value and the first derivative the transition zone is always situated at the respective part (F,Z,N) of the focal portion (1) and the rim zone (3), which forms an afocal margin of constant thickness with the inside surface.

* * * * *